United States Patent
Chamaken Kamde et al.

(10) Patent No.: US 10,794,477 B2
(45) Date of Patent: Oct. 6, 2020

(54) METHOD FOR OPERATING A PNEUMATIC ACTUATING SYSTEM OF A TRANSMISSION AND CONTROL DEVICE FOR CARRYING OUT THE METHOD

(71) Applicant: ZF Friedrichshafen AG, Friedrichshafen (DE)

(72) Inventors: Alain Tierry Chamaken Kamde, Friedrichshafen (DE); Wilhelm Moser, Oberteuringen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/465,635

(22) PCT Filed: Nov. 17, 2017

(86) PCT No.: PCT/EP2017/079546
§ 371 (c)(1),
(2) Date: May 31, 2019

(87) PCT Pub. No.: WO2018/104026
PCT Pub. Date: Jun. 14, 2018

(65) Prior Publication Data
US 2019/0309842 A1    Oct. 10, 2019

(30) Foreign Application Priority Data
Dec. 9, 2016 (DE) .................... 10 2016 224 550

(51) Int. Cl.
*F16H 61/12* (2010.01)
*F15B 11/20* (2006.01)
(Continued)

(52) U.S. Cl.
CPC .............. *F16H 61/12* (2013.01); *F15B 11/20* (2013.01); *F15B 19/005* (2013.01);
(Continued)

(58) Field of Classification Search
None
See application file for complete search history.

(56) References Cited

U.S. PATENT DOCUMENTS 5,748,077 A * 5/1998 Brandt .................. B60T 11/323
340/450
6,026,682 A    2/2000 McCormick
(Continued)

FOREIGN PATENT DOCUMENTS

DE        103 55 250 A1    6/2005
DE    10 2008 042 129 A1    3/2010
(Continued)

OTHER PUBLICATIONS

German Search Report Corresponding to 10 2016 224 550.3 dated Sep. 22, 2017.
(Continued)

*Primary Examiner* — Dirk Wright
(74) *Attorney, Agent, or Firm* — Davis & Bujold PLLC; Michael J. Bujold

(57) ABSTRACT

A method for operating a pneumatic actuating system of a transmission. The actuating system has an air reservoir at a first pressure. The reservoir couples an actuating space of the actuating system which is at a second pressure, and the actuating space couples, via control valves, shifting cylinders. When conducting a transmission gearshift, an air mass delivered to the active shifting cylinders via corresponding control valves, and an air mass sum including a nominal air mass in the active cylinders required for accomplishing the gearshift and an actual basic leakage from the activated shifting cylinder are determined. A defect leak in the pneumatic actuating system is recognized, if the air mass delivered to the active shifting cylinders is larger than the air mass sum. If a defect leak is recognized, the control valves coupling the actuating space and the shifting cylinders are shut off for a period of time.

9 Claims, 2 Drawing Sheets

(51) Int. Cl.
*F15B 19/00* (2006.01)
*F16H 61/00* (2006.01)
*F16H 61/02* (2006.01)

(52) U.S. Cl.
CPC ..... *F16H 61/0021* (2013.01); *F16H 61/0262* (2013.01); *F15B 2211/41572* (2013.01); *F15B 2211/6653* (2013.01); *F15B 2211/7053* (2013.01); *F15B 2211/71* (2013.01); *F15B 2211/8636* (2013.01); *F15B 2211/87* (2013.01); *F16H 2061/1208* (2013.01); *F16H 2061/1232* (2013.01); *F16H 2061/1248* (2013.01); *F16H 2061/1264* (2013.01); *F16H 2061/1288* (2013.01); *F16H 2061/1292* (2013.01)

(56) References Cited

U.S. PATENT DOCUMENTS

| | | | |
|---|---|---|---|
| 6,954,683 B2* | 10/2005 | Junk | F15B 13/0402 |
| | | | 700/282 |
| 7,031,850 B2* | 4/2006 | Kambli | F15B 19/005 |
| | | | 700/281 |
| 7,272,533 B2* | 9/2007 | Schlosser | F15B 19/005 |
| | | | 702/184 |
| 8,366,588 B2 | 2/2013 | Gansohr et al. | |
| 8,874,340 B2* | 10/2014 | Salewski | F16D 48/066 |
| | | | 701/68 |
| 9,658,628 B2* | 5/2017 | Burt | F24F 11/83 |
| 9,891,135 B2* | 2/2018 | Aki | F15B 15/2815 |
| 10,563,753 B2* | 2/2020 | Kawale | F16H 61/06 |
| 2014/0305508 A1 | 10/2014 | Naquin | |
| 2018/0195537 A1* | 7/2018 | Bohm | F15B 15/2815 |

FOREIGN PATENT DOCUMENTS

| | | |
|---|---|---|
| DE | 10 2011 075 168 A1 | 11/2012 |
| DE | 10 2015 210 668 A1 | 12/2016 |
| WO | 2006/097297 A1 | 9/2006 |

OTHER PUBLICATIONS

International Search Report Corresponding to PCT/EP2017/079546 dated Jun. 11, 2018.
Written Opinion Corresponding to PCT/EP2017/079546 dated Jun. 11, 2018.

* cited by examiner

METHOD FOR OPERATING A PNEUMATIC ACTUATING SYSTEM OF A TRANSMISSION AND CONTROL DEVICE FOR CARRYING OUT THE METHOD

This application is a National Stage completion of PCT/EP2017/079546 filed Nov. 17, 2017, which claims priority from German patent application serial no. 10 2016 224 550.3 filed Dec. 9, 2016.

FIELD OF THE INVENTION

The invention relates to a method for operating a pneumatic actuating system of a transmission. In addition, the invention relates to a control unit designed to carry out the method, and to a corresponding computer program product.

BACKGROUND OF THE INVENTION

From practice it is known to actuate shifting elements of a transmission such as shifting cylinders of a transmission with the help of a pneumatic actuating system. A pneumatic actuating system of this type has an air reservoir which is coupled via at least a first control valve to an actuator space of the actuating system. Starting from the actuator space of the actuating system each shifting cylinder can be supplied with air by way of at least one second control valve in each case. Defect leaks in the actuating system or in the transmission can prevent the shifting cylinders from being properly actuated any longer, and because of that, under some circumstances it is no longer possible to carry out gearshifts reliably in the transmission. In some cases this can result in total immobilization of a vehicle having the transmission concerned. It is therefore important to determine any defect leak that may occur in a pneumatic actuating system of a transmission in a reliable manner, in order as a function thereof to initiate a compensating reaction if necessary, as for example a modified shifting sequence in order to maintain the readiness of the vehicle for use.

From DE 10 2011 075 168 A1 a method for recognizing a leak in an actuating device of a pressure-medium-actuated clutch is known, such that according to that prior art the actuation path of a piston of the actuating cylinder is determined over time with the clutch open and the valves closed, and from this the degree of leakage from the actuating cylinder over time is determined.

SUMMARY OF THE INVENTION

Starting from there, the purpose of the present invention is to provide a new method for operating a pneumatic actuating system of a transmission. In particular, a new type of method for recognizing a defect leak in the pneumatic actuating system of the transmission and a method for reacting to a defect leak recognized in a pneumatic actuating system of the transmission are proposed. In addition a corresponding control unit and a computer program product for carrying out the method are indicated.

From a process-technological standpoint this objective is achieved with the features of the independent claims. A control unit and a computer program product are also objects of the further independent claims. Advantageous further developments are the object of the subordinate claims and of the description that follows.

According to a first embodiment of the invention, a method for operating a pneumatic actuating system of a transmission is proposed, in which the pneumatic actuating system comprises an air reservoir in which a first pressure is present. The air reservoir is coupled to an actuating space of the pneumatic actuating system, in which a second pressure is present. The actuating space of the pneumatic actuating system is coupled to shifting cylinders of the transmission by way of control valves.

It is provided that when a gearshift is carried out in the transmission, an air mass delivered to the active shifting cylinders via the corresponding control valves and an air mass sum consisting of the nominal air quantity required for carrying out the gearshift in the active shifting cylinders, added to a current basic leakage from the activated shifting cylinders, are determined and it is concluded that there is a defect leak in the pneumatic actuating system if the air mass delivered to the active shifting cylinders is larger than the air mass sum.

With the present first embodiment of the invention, a comparative balance of the air masses used in the active shifting cylinders while a gearshift is carried out is proposed. In the event of a defect leak that indicates a malfunction, the air mass delivered to the active shifting cylinders by way of the corresponding control valves is substantially greater than the air mass sum, which depends on the air mass in the active shifting cylinders and the air mass of a current basic leakage taking place from the active shifting cylinders even when the actuating system is functioning correctly. By means of such a comparison, a defect leak in the actuating system can be determined simply and reliably.

According to an advantageous further development it is concluded that there is a defect leak in the pneumatic actuating system if, while a gearshift is being carried out in the transmission, the air mass delivered to the shifting cylinder is larger than the air mass sum over a defined time period. In that way a defect leak in the pneumatic actuating system can be detected in a particularly advantageous manner.

Preferably, the air mass delivered via the control valves to the active shifting cylinders is determined as a function of the mass flow through the active control valves, wherein the mass flow through an active control valve is determined as a function of the pressure present in the actuating space and as a function of a maximum mass flow through the control valve concerned. This determination of the air mass delivered to the shifting cylinders via the control valves is simple and reliable.

Preferably, the nominal air mass in the active shifting cylinders for the air mass sum is determined as a function of a piston area of the active shifting cylinder concerned and as a function of shifting paths of the active shifting cylinder concerned. This allows a simple and reliable determination of the air mass in the shifting cylinders for the air mass sum.

The current basic leakage from the active shifting cylinder concerned for the air mass sum is preferably determined as a function of a previous basic leakage from the active shifting cylinder concerned. In that way the natural basic leakage from the active shifting cylinder, which takes place even during a non-defective leak in the pneumatic actuating system, can be determined simply and reliably.

In a second embodiment of the invention a method for operating a pneumatic actuating system of a transmission is proposed, which pneumatic actuating system comprises an air reservoir in which a first pressure is present. The air reservoir is coupled with an actuating space of the pneumatic actuating system in which a second pressure is present. The actuating space of the pneumatic actuating system is coupled to shifting cylinders by way of control valves.

It is provided that when a defect leak is recognized in the pneumatic actuating system, the control valves of the pneumatic actuating system connected to the actuating space of the pneumatic actuating system and the shifting cylinders of the transmission are shut off for a parameterizable period of time. This can prevent air from the actuating space of the pneumatic actuating system from escaping in an uncontrolled manner.

When the control valves of the pneumatic actuating system are shut off, air is supplied to the pneumatic actuating system by a pump or an air compressor. By virtue of this air mass, pressure is built up again in the actuating space of the pneumatic actuating system, since by shutting off the control valves the connection between the actuating space and the shifting cylinders of the transmission is interrupted.

After the lapse of the parameterizable shut-off period, the control valves required for carrying out a gearshift in the transmission are finally actuated, whereby the shifting cylinders of the transmission associated with the control valves are acted upon by pressure.

Thus, by virtue of the method according to the invention a compensatory reaction in the event of a recognized defect leak in the pneumatic actuating system is proposed, by means of which a gear can reliably be engaged in the transmission even when there is a recognized defect leak. The shut-off period of the control valves when a defect leak is recognized can be, for example, 400 to 600 milliseconds.

Furthermore, a control unit for operating a pneumatic actuating system of a motor vehicle is indicated, which is adapted for carrying out the method according to the invention. The control unit can for example be in the form of a transmission control unit.

The solution according to the invention can also be incorporated as a computer program product, which when it is run on a processor of a control device instructs the processor by software means to carry out the associated process steps which are the object of the invention. In this connection a computer-readable medium is also part of the object of the invention, on which medium a computer program product as described above can be retrievably stored.

The invention is not limited to the indicated combination of the characteristics of the independent claims or the claims that depend on them. There are in addition possibilities for combining individual characteristics with one another, provided that they derive from the claims, the description given below or directly from the drawings. References in the claims to the drawings by the use of indexes are not intended to restrict the protective scope of the claims.

BRIEF DESCRIPTION OF THE DRAWINGS

To clarify the invention drawings with example embodiments are attached to the description. The drawings show.

DETAILED DESCRIPTION OF THE PREFERRED EMBODIMENTS

The invention relates to a method for recognizing a leak that is too large, or is incorrect, in a pneumatic actuating system of a transmission, which leak can lead to the fact that gearshifts can no longer be carried out properly in the transmission. Such a leak is termed a defect leak. Furthermore, the invention relates to a method by which, if a defect leak in the pneumatic actuating system has been recognized, a compensatory reaction is initiated by means of which a gear can be reliably engaged in the transmission even when a defect leak has been recognized. In addition the invention relates to a control unit for carrying out the method.

Figure 1:
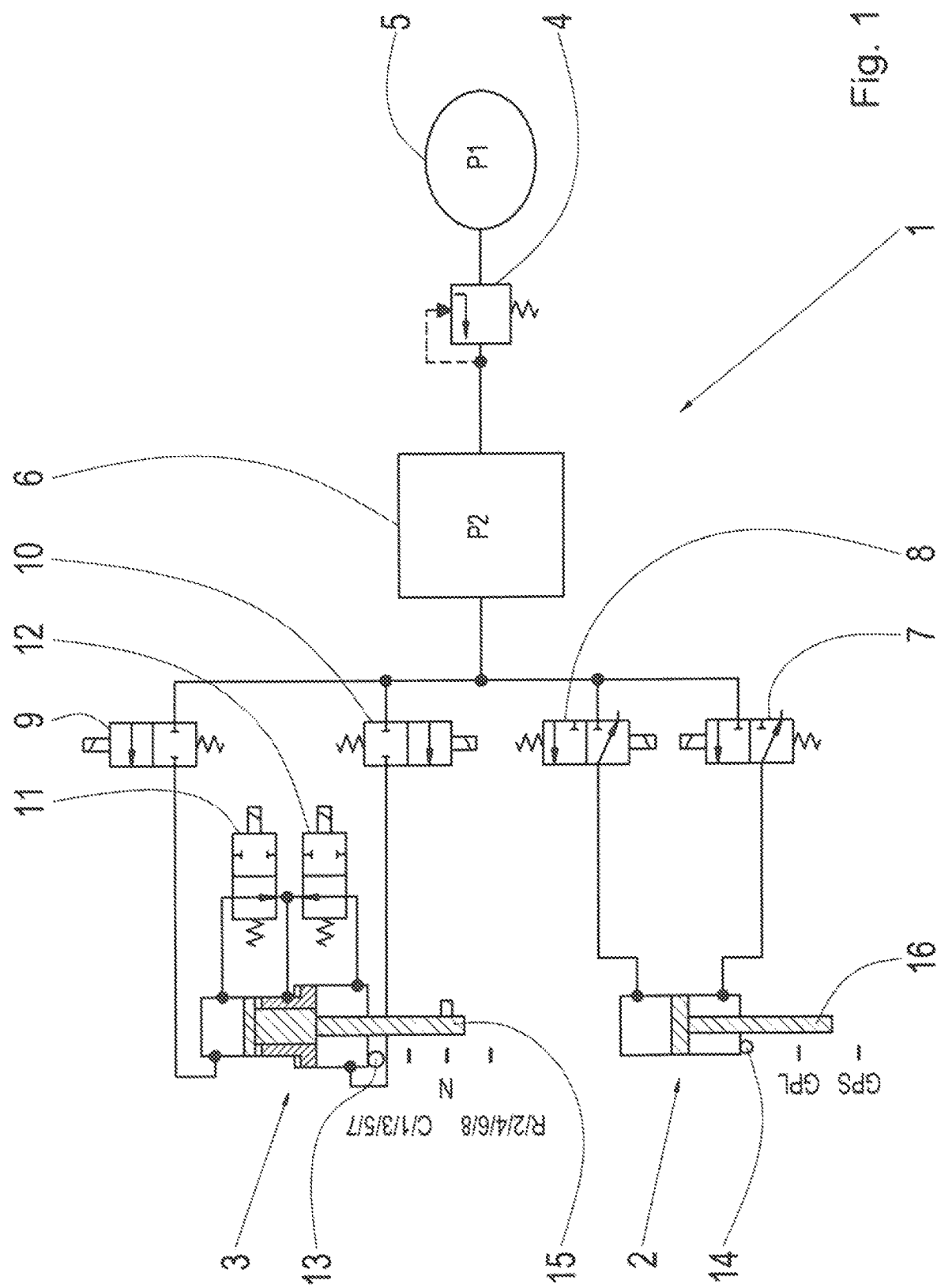
FIG. 1: A block circuit diagram of a pneumatic actuating system of a transmission.

FIG. 1 shows, as an example, the basic structure of a pneumatic actuating system 1 for a transmission, namely in FIG. 1 for a group transmission such that each part of the group transmission comprises a shifting cylinder 2, 3 that is to be actuated pneumatically. The shifting cylinder 2 shown in FIG. 1 is a pneumatically actuated shifting cylinder of a splitter group of the group transmission, which can be actuated by two control valves 7, 8. The shifting cylinder 3 is a pneumatically actuated shifting cylinder of a main transmission of the group transmission, which can be actuated by four control valves 9, 10, 11, 12. Associated with the shifting cylinder 2, which serves to actuate the splitter group, there is a position sensor 14 with the help of which the position of an actuating piston 16 of the shifting cylinder 2 can be detected by measurement-technological means. Associated with the shifting cylinder 3, which serves to actuate the main transmission, there is a position sensor 13 with the help of which the position of an actuating piston 15 of the shifting cylinder 3 can be detected by measurement-technological means.

The pneumatic actuating system 1 of FIG. 1 comprises an air reservoir 5. In the air reservoir 5 there is present a first pressure, namely a pressure $p_1$. Furthermore the pneumatic actuating system 1 comprises a so-termed actuating space 6 in which there is a second pressure, namely a pressure $p_2$. The actuating space 6 is connected to the air reservoir 5 by way of a pressure-reducing valve 4. By means of the pressure-reducing valve 4, the pressure $p_1$ in the air reservoir 5 is reduced to an adjustable constant pressure $p_2$.

Starting from the actuating space 6, the shifting cylinders 2, 3 can be supplied with compressed air, each shifting cylinder 2, 3 being coupled to the actuating space 6 by way of control valves 7, 8, 9, 10. In the example embodiment of FIG. 1 each of the shifting cylinders 2, 3 is coupled to the actuating space 6 via two respective control valves, 7, 8 and 9, 10.

In order, now for example, to be able to reliably recognize a defect leak in the pneumatic actuating system 1 of a transmission shown as an example in FIG. 1, when a gearshift is carried out in the transmission during which one or both of the shifting cylinders 2, 3 of the transmission are supplied with compressed air and in which one or more of the control valves 7, 8, 9, 10 is/are active, an air mass delivered to the active shifting cylinders 2, 3 via the corresponding control valves 7, 8, 9, 10 is determined. In addition an air mass sum consisting of a nominal air mass required for carrying out the gearshift in the active shifting cylinders 2, 3 and a current basic leakage from the active shifting cylinder 2, 3 is determined. The basic leakage is also referred to as the natural leakage and always occurs during the operation of the pneumatic actuating system 1. If the air mass delivered to the active shifting cylinders 2, 3 is larger than the air mass sum, it is concluded that there is a defect leak in the pneumatic actuating system 1, namely if while a gearshift is being carried out in the transmission the air mass delivered to the shifting cylinders 2, 3 remains larger than the air mass sum for a defined period of time.

Accordingly, according to the invention a comparative balancing of the air mass consumed in the pneumatic actuating system 1 while a gearshift is taking place is carried out. In the event of a defect leak, the air mass delivered to the active shifting cylinders 2, 3 by way of the corresponding control valves 7, 8, 9, 10 is substantially larger than the air mass sum which consists of the air mass in the active shifting cylinders 2, 3 added to the air mass of a current basic leakage from the active shifting cylinders 2, 3. If the difference between the air mass flowing via the control valves 7, 8, 9, 10 into an active shifting cylinder 2, 3 and the air mass sum consisting of the nominal air mass in the active cylinders 2, 3 during an active gearshift and the air mass attributable to the natural leakage from the active shifting cylinders 2, 3 is larger than a defined limit value, a defect leak in an active shifting cylinder is recognized. Leak detection is carried out separately for each of the shifting cylinders 2, 3.

On the assumption that all gearshifts in the transmission are carried out with a supercritical pressure ratio, the air mass delivered to the active shifting cylinder via an active control valve 7, 8, 9, 10 is calculated from the following equations:

$$\dot{m}_{ist} = \int \dot{m}_{ist} * dt$$

$$\dot{m}_{ist} = \psi_{MAX}$$

$$\psi_{MAX} = C * p_2 * \rho * \sqrt{\left(\frac{T_0}{T}\right)}$$

$$C = \frac{k * \alpha_D * Q * \psi_{MAX} * \sqrt{(2 * R_S * T_0)}}{p_0}$$

in which $m_{ist}$ is the air mass delivered to the active shifting cylinder via the active control valve 7, 8, 9, 10 concerned, $\dot{m}_{ist}$ is the mass flow through the active control valve 7, 8, 9, 10 concerned, $p_2$ is the pressure present in the actuating space 6, $\psi_{MAX}$ is the maximum mass flow through the active control valve 7, 8, 9, 10 concerned, C is a pneumatic conductance value of the active control valve 7, 8, 9, 10 concerned, $\rho$ is the air density, $T_0$ is the absolute air temperature in the normal condition, T is the current actual air temperature, k is an adaptation factor of the active control valve 7, 8, 9, 10 concerned, $\alpha_D$ is a pneumatic correction factor of the active control valve 7, 8, 9, 10 concerned, $R_S$ is the specific gas constant, $p_0$ is an air pressure of the air in the normal condition and Q is the valve cross-section of the active control valve 7, 8, 9, 10 concerned.

Thus, according to the above formulas the air mass flowing through the active control valve 7, 8, 9, 10 concerned, starting from the actuating space 6 and into the shifting cylinder 2, 3, is obtained by integrating the mass flow through the active control valve 7, 8, 9, 10 concerned.

Figure 2:
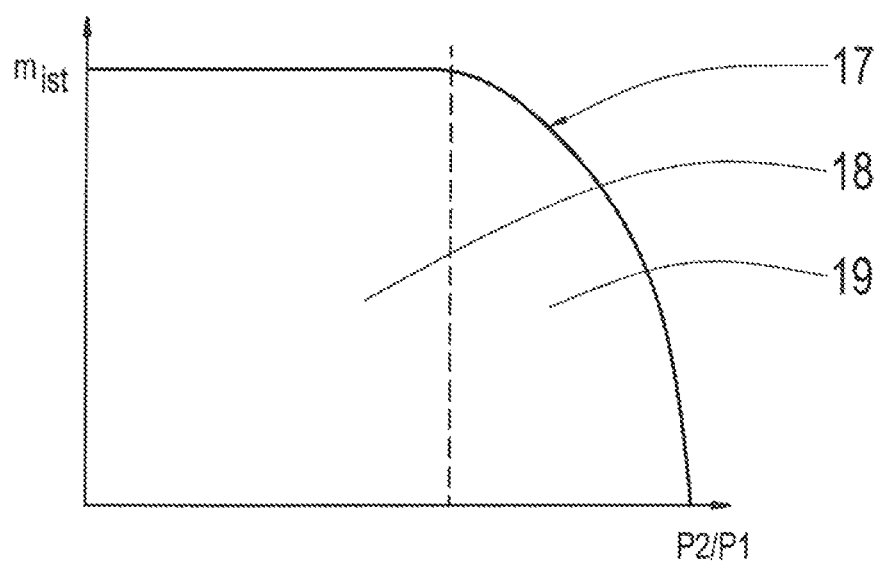
FIG. 2: A diagram to make clear details of the method for operating the pneumatic actuating system.

According to FIG. 2, in the determination of the air mass delivered to the active shifting cylinder 2, 3 via the active control valves 7, 8, 9, 10 concerned, there is a distinction between actuating the control valves 7, 8, 9, 10 in a supercritical range 18 in which the mass flow is constant, and actuating the control valves 7, 8, 9, 10 in a below-critical range 19 in which the mass flow is not constant. As can be seen from the shape of the curve 17 in FIG. 2, the mass flow through the control valves 7, 8, 9, 10 in the below-critical range 19 is approximated by an ellipse. On the assumption that all gearshifts in the transmission are carried out at a supercritical pressure ratio, the mass flow through the control valves 7, 8, 9, 10 will be constant. This constant mass flow is likewise also the maximum mass flow through the control valves 7, 8, 9, 10.

The nominal air mass in the active shifting cylinder 2, 3 concerned, required for carrying out a successful gearshift in the transmission, is determined as a function of a piston area of the active shifting cylinder 2, 3 concerned and as a function of shifting paths of the active shifting cylinder 2, 3 concerned.

The nominal air mass of the active shifting cylinder 2, 3 concerned for the air mass sum is preferably calculated from the following equations:

$$m_{Soll} = \rho * V_{Soll}$$

$$V_{Soll} = V_1 + V_2$$

$$V_1 = A_1 * (x - l_{MIN})$$

$$V_2 = A_2 * (l_{MAX} - x)$$

in which $m_{Soll}$ is the actual nominal air mass of the active shifting cylinder, $V_{Soll}$ is the actual nominal volume of the active shifting cylinder, $\rho$ is the air density, $V_1$ is the active volume in the first actuation direction of the actuating piston, $V_2$ is the active volume in the second actuation direction of the actuating piston, $A_1$ is the active piston area in the first actuation direction of the actuating piston, $A_2$ is the active piston area in the second actuation direction of the actuating piston, x is the current piston position, $l_{max}$ is the maximum shifting path and $l_{min}$ is the minimum shifting path.

For example, the first actuation direction of the actuating piston can be understood to mean an actuation of the actuating piston in the direction toward increasing position values. The second actuation direction of the actuating piston is opposite to the first actuation direction and corresponds to an actuation of the actuating piston in the direction toward decreasing position values.

Thus, from the active volume $V_1$ in the first actuation direction and the active volume $V_2$ in the second actuation direction, the nominal air mass $m_{Soll}$ in the shifting cylinder during an active gearshift can be calculated. In doing this, in the main transmission there is a difference between gearshifts away from and toward neutral since the respective active piston areas are different.

To the above volumes $V_1$, $V_2$, a dead volume of the shifting cylinder can also be additively superimposed.

The actual basic leakage of the active shifting cylinder 2, 3 concerned for the air mass sum is preferably calculated from the following equation:

$$m_{L(k)} = m_{L(k-1)} + \frac{V_{soll}}{R_S * T} * \dot{p} * t_S$$

in which $m_{L(k)}$ is the actual basic leakage from the active shifting cylinder concerned, $m_{L(k-1)}$ is the previous basic leakage from the active shifting cylinder concerned, $V_{Soll}$ is the actual nominal volume of the active shifting cylinder concerned, $R_S$ is the specific gas constant of air, T is the current air temperature, $\dot{p}$ is the rate of change of the air pressure and $t_S$ is a scanning rate. The above equation applies on the assumption that the volume $V_{Soll}$ and the rate of change of the air pressure $\dot{p}$ are constant.

For each shifting cylinder that is active while carrying out a gearshift, the air mass $m_{ist}$ and the basic leakage according to the above formula are determined separately.

As already stated, a defect leak in the pneumatic actuating system 1 is recognized when, over a defined time period while a gearshift is being carried out in the transmission, the air mass $m_{ist}$ delivered via the corresponding control valves 7, 8, 9, 10 to the active shifting cylinder 2, 3 is larger than the air mass sum consisting of the nominal air mass $m_{Soll}$ required for carrying out the gearshift in the active shifting cylinder 2, 3 and the actual basic leakage $m_{Leak}$ from the active shifting cylinder 2, 3:

$$m_{ist} > m_{Soll} + m_{Leak}$$

When it is concluded that there is a defect leak in the actuating system 1, countermeasures can be initiated to nevertheless enable a defined operation of the transmission. According to the present invention it is provided that when a defect leak is recognized in the pneumatic actuating system 1 the control valves 7, 8, 9, 10 of the pneumatic actuating system 1 connected to the actuating space 6 and the shifting cylinders 2, 3 are shut off for a parameterizable time period. When a defect leak is recognized, this can prevent air from flowing out of the actuating space 6 of the pneumatic actuating system 1 in an uncontrolled manner.

When the control valves 7, 8, 9, 10 are shut off, air can be supplied to the pneumatic actuating system 1 by means of an air compressor, whereby in the actuating space 6 a pressure $p_2$ is built up again, since by virtue of the shut-off control valves 7, 8, 9, 10 the connection between the actuating space 6 and the shifting cylinders 2, 3 is interrupted.

After the lapse of the parameterizable shut-off duration, the control valves 7, 8, 9, 10 required for carrying out a gearshift are actuated so that by means of the pressure $p_2$ built up in the actuating space a gear can be engaged in the transmission.

When a gearshift is carried out, the air mass delivered via the control valves 7, 8, 9, 10 to the shifting cylinders 2, 3 concerned is determined as a function of a mass flow by way of the control valve 7, 8, 9, 10 concerned.

The invention also relates to a control unit for carrying out the method according to the invention. The control unit comprises means that serve to carry out the method according to the invention. These means include hardware means and software means. The hardware means are data interfaces for the exchange of data between the assemblies involved in carrying out the method according to the invention. For example, the control unit exchanges data with the position sensors 13, 14 which are built into the shifting cylinders 3, 2 and which sense the positions of the actuating pistons 15, 16. The hardware means of the control unit also include a processor for data processing and a memory for data storage. The software means consist of program modules for carrying out the method according to the invention.

INDEXES

1 Actuating system
2 Actuating cylinder
3 Actuating cylinder
4 Pressure-reducing valve
5 Air reservoir
6 Actuating space
7 Control valve
8 Control valve
9 Control valve
10 Control valve
11 Control valve
12 Control valve
13 Position sensor
14 Position sensor
15 Actuating piston
16 Actuating piston
17 Curve shape
18 Supercritical range
19 Below-critical range

The invention claimed is:

1. A method of operating a pneumatic actuating system of a transmission, the actuating system having an air reservoir in which a first pressure is present, the air reservoir being coupled to an actuating space of the actuating system in which a second pressure is present, and the actuating space being coupled, by way of control valves, to shifting cylinders, the method comprising:
    when a gearshift is carried out in the transmission, determining an air mass delivered to the active shifting cylinders, via the corresponding control valves, and an air mass sum which comprises a nominal air mass in the active shifting cylinders required for carrying out the gearshift and an actual basic leakage from the activated shifting cylinder; and
    if the air mass delivered to the active shifting cylinders is larger than the air mass sum, concluding that there is a defect leak in the pneumatic actuating system.

2. The method according to claim 1, further comprising concluding that the defect leak in the pneumatic actuating system exists if, while a gearshift is being carried out in the transmission, the air mass delivered to the shifting cylinder remains larger than the air mass sum over a defined time period.

3. The method according to claim 1, further comprising determining the air mass delivered via the control valves to the active shifting cylinders as a function of a mass flow through the active control valves; and
    determining a mass flow through an active control valve as a function of the pressure present in the actuating space and as a function of a maximum mass flow through the shifting valve concerned.

4. The method according to claim 1, further comprising determining the nominal air mass for the active shifting cylinders as a function of a piston area of the active shifting cylinder concerned and as a function of shifting paths of the active shifting cylinder concerned.

5. The method according to claim 1, further comprising determining an actual basic leakage from the active shifting cylinder concerned as a function of a previous basic leakage from the active shifting cylinder concerned.

6. A method for operating a pneumatic actuating system of a transmission, the actuating system having an air reservoir in which a first pressure is present, the air reservoir being coupled to an actuating space of the actuating system in which a second pressure is present, and the actuating space being coupled to shifting cylinders by way of control valves, the method comprising:
    when a defect leak is recognized in the pneumatic actuating system, shutting off the control valves of the pneumatic actuating system connected to the actuating space and the shifting cylinders for a parameterizable period of time.

7. The method according to claim 6, further comprising, when the control valves of the pneumatic actuating system are shut off, building up a pressure in the actuating space of the pneumatic actuating system by an air mass delivered by an air compressor.

8. The method according to claim 7, further comprising, after a lapse of the parameterizable time period, actuating the control valves required for carrying out a gearshift in the transmission, and acting upon the shifting cylinders associated with the control valves by pressure.

9. A control unit for operating a pneumatic actuating system of a transmission, the actuating system comprising an air reservoir in which a first pressure is present, the air reservoir being coupled to an actuating space of the actuating system in which a second pressure is present, and the actuating space being coupled to shifting cylinders by way of control valves, and, when a gearshift is carried out in the transmission, the control unit actuates the control valves and determines an air mass delivered to active shifting cylinders via the corresponding control valves and an air mass sum consisting of a nominal air mass in the active shifting cylinders required for carrying out the gearshift and an actual basic leakage from the activated shifting cylinder, and, if the air mass delivered to the active shifting cylinders is larger than the air mass sum, the control unit detecting a defect leak in the pneumatic actuating system, and, if a defect leak is determined, the control unit initiates a compensatory reaction in the pneumatic actuating system.

* * * * *